Dec. 16, 1924.
C. W. CAROL
CHICKEN HOVER
Filed Aug. 28, 1924
1,519,115
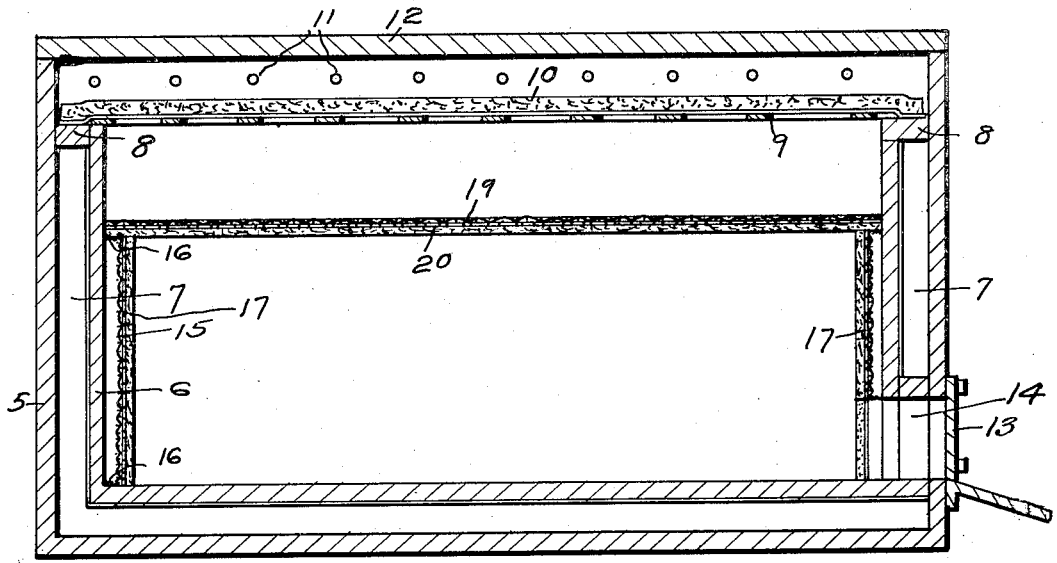
Fig. 1.
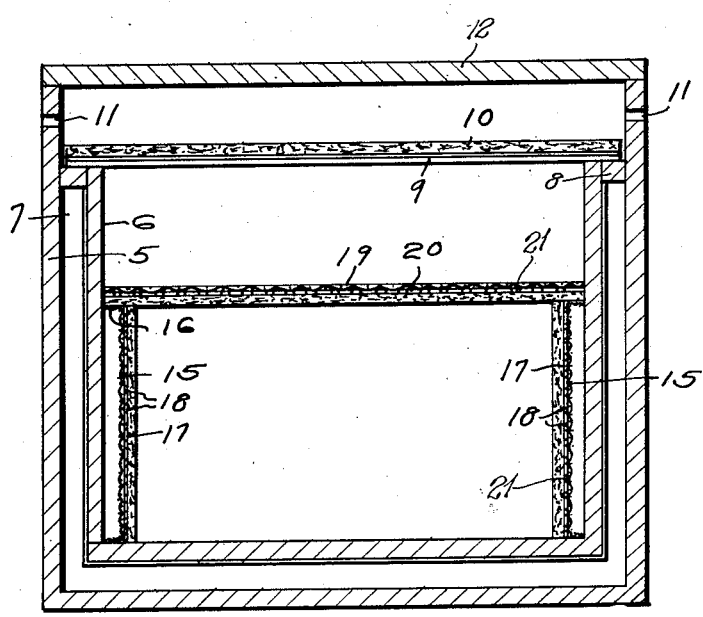
Fig. 2.
Fig. 3.
Inventor
Charles W. Carol,
By Samuel Herrick
Attorney Patented Dec. 16, 1924.

1,519,115

UNITED STATES PATENT OFFICE.

CHARLES WATTS CAROL, OF GLOBE, ARIZONA.

CHICKEN HOVER.

Application filed August 28, 1924. Serial No. 734,654.

*To all whom it may concern:*

Be it known that CHARLES WATTS CAROL, citizen of the United States, residing at Globe, in the county of Gila and State of Arizona, has invented certain new and useful Improvements in Chicken Hovers, of which the following is a specification.

This invention relates to a chicken hover of the character of that shown in my patent, Number 1,507,157 issued on the 2nd day of September, 1924.

The object of the invention is to provide an improved hover whereby baby chicks may be artificially mothered without danger of the chicks being crowded or smothered to death.

Broadly stated the invention resides in lining the walls of a hover with sheep skin with the wool side toward the chicks and with ventilating openings formed through these skins whereby, while the chicks will be kept warm by the wool, they will not be smothered by lack of ventilation.

Further objects and advantages of the invention will be set forth in the detailed description which follows:

In the accompanying drawings,

Figure 1 is a longitudinal sectional view of a hover constructed in accordance with the invention.

Figure 2 is a transverse sectional view therethrough, and

Figure 3 is a detail sectional view upon an enlarged scale illustrating the manner of supporting the sheep skin in spaced relation to the side wall of the hover.

Like numerals designate corresponding parts in all of the figures of the drawings.

Referring to the drawing 5 designates an outer box and 6 designates an inner box so disposed with relation to the outer box as to leave a space 7 between them which extends entirely around the box. The air may be exhausted from this space 7 to form a vacuum or this space may be an air space, as desired. The inner box is held in spaced relation to the outer box by strips 8. A supporting lattice or open work structure 9 spans the top of the inner box so as to support a layer of cotton batting 10 of such density that while the air and gases from the chicks may seep slowly through said batting, the passage of well defined air currents, which might tend to chill the chicks, is prevented. The space between the outer box, above the inner box, is ventilated by transverse openings 11 and the outer box is provided with a cover 12. Access may be had to the inner box through a door 13 and passageway 14.

So far as described the structure is like that of my prior patent above referred to. Considering now more particularly the differences by which the present structure is distinguished from the patent before referred to, attention is directed to the inner lining of the inner box consisting of wire mesh 15, preferably of copper or like non-corrodible metal, said wire mesh having its upper and lower edges bent at right angles, as indicated at 16 to constitute spacing elements by which the wire mesh is held in spaced relation to the inner face of the inner box. The purpose of this is to permit the circulation of the air and gases, as represented by the breath and body gases of the chicks. The wire mesh 15 supports sheep skins 17. The skins are pierced by a large number of relatively small, clean cut, holes 18 formed through them. These holes are so small that the chicks cannot get their heads therethrough. Said holes serve to permit the passage of the breath of the chicks and the body gases to the rear of the skins. As is best illustrated in Figures 2 and 3, the wool side of the sheep skins are disposed inwardly and the chicks may snuggle up against these wooly surfaces and be kept warm and comfortable.

A horizontal web of wire indicated at 19 has a sheep skin 20 secured thereto with the wool side disposed downwardly and this protects the backs of the chicks. The skin 19 likewise has a number of clean cut openings 21 formed therethrough to permit the passage of the breath and body gases of the chicks upwardly into the space between the screen 19 and the cotton batting 10, from which space they may slowly seep through said cotton batting to the space above said batting from whence they may pass through the openings 11.

I am aware of the fact that it has heretofore been proposed to use sheep skins in the hovering of baby chicks but I am not aware that it has ever heretofore been proposed to designedly form a plurality of ventilating openings through the skin proper in the manner herein described or to space the rear sides of the skins from the wall of the compartment to provide for ventilation at that point.

It is to be understood that the invention is not limited to the precise construction set forth but that it includes within its purview whatever changes fairly come within either the terms or the spirit of the appended claims.

Having described my invention what I claim is:

1. In a chicken hover a lining element consisting of a sheep skin having a plurality of openings formed through the skin proper, the wool side of the skin being disposed toward the chick to be hovered.

2. In a chicken hover, a compartment for the reception of the chicks to be hovered, a sheep skin having a plurality of openings formed through the skin proper with the wool side of the skin disposed toward said compartment and means for supporting said skin in spaced relation to the wall of said compartment.

3. A structure as recited in claim 2 wherein said supporting means consists of a wire mesh screen.

4. A structure as recited in claim 2 wherein the supporting means consist of a wire mesh web having its edges bent to form spacing elements.

5. A hover comprising a double wall compartment constituting an inner and an outer box and a lining for the walls of the inner compartment consisting of sheep skin with the wool side disposed toward said compartment said skin being disposed in spaced relation to the wall of the compartment and having a plurality of openings formed therethrough.

6. A structure as recited in claim 5 in combination with a horizontal web of sheep skin constituting a cover for said compartment with the wool side disposed downwardly, said last named sheep skin likewise having a plurality of openings formed therethrough.

In testimony whereof he affixes his signature in the presence of two witnesses.

CHARLES WATTS CAROL.

Witnesses:
Gus Williams,
D. E. Rienhardt.